Oct. 23, 1945.  J. D. McINTIRE  2,387,674
CLEAT TURNER AND GRADING TABLE
Filed Feb. 11, 1943
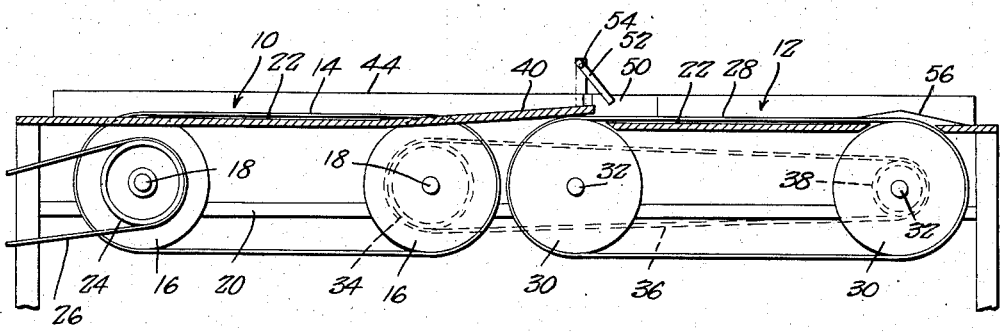
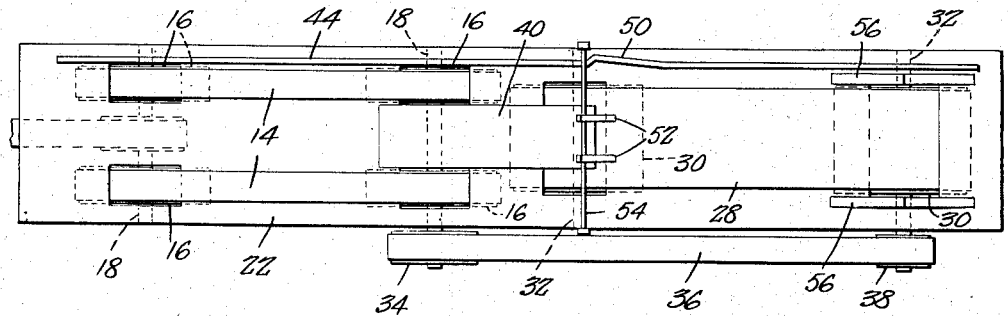
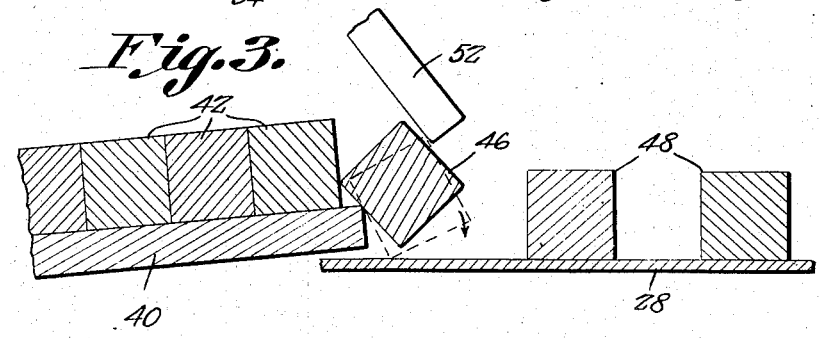
James D. McIntyre,
INVENTOR.
BY
Victor J. Evans & Co.
ATTORNEYS
WITNESSES:

Patented Oct. 23, 1945

2,387,674

UNITED STATES PATENT OFFICE 2,387,674

CLEAT TURNER AND GRADING TABLE

James Donald McIntyre, Crystal River, Fla.

Application February 11, 1943, Serial No. 475,542

5 Claims. (Cl. 198—33)

My invention relates to the manufacture of frame structural members for wooden boxes, crates and the like, and has among its objects and advantages the provision of an improved cleat turner and grading table.

In the manufacture of many types of boxes and crates, the frame structure of the box is usually made up of wooden cleats sawn from dressed boards. The dressed boards are subdivided into cleats, as through the medium of a rip saw, and the cleats are then run through a miter or tongue and groove machine.

In the manufacture of many cleats, it is necessary to turn the cleats ninety degrees in their passage between the rip saw and the woodworking machine. Such turning is done in order to position the sawn surfaces of the cleats on the top and bottom faces and the dressed surfaces on the sides. Such turning is usually done by several operators stationed between the rip saw and the woodworking machine.

Accordingly an object of my invention is to provide a cleat turner and grading table wherein a novel conveyor is utilized for transferring the cleats as they come from the rip saw to a position at the woodworking machine, wherein novel means are incorporated for mechanically and automatically turning the cleats as a function of their movement by the conveyor.

A further object is to provide a cleat turner and grading table wherein a conveyor is designed in a novel manner to turn the cleats mechanically, and in which novel means are incorporated for spacing the turned cleats so as to render the four sides thereof visible at one time or another to the end that the cleats may be effectively graded.

In the accompanying drawing:

Figure 1 is a side elevational view of a conveyor system in accordance with my invention;

Figure 2 is a top plan view; and

Figure 3 is an enlarged sectional view of a portion of the conveyor and cleats thereon illustrating the manner in which the cleats are turned ninety degrees and spaced one from the other.

In the embodiment selected for illustration, I make use of a first conveyor unit 10 and a second conveyor unit 12, the latter receiving cleats from the former. Conveyor unit 10 comprises two spaced, endless belts 14. Each belt 14 passes over two pulleys 16, there being two pulleys 16 keyed to each of the shafts 18. These shafts may be suitably supported in bearings mounted on a frame structure 20, and the pulleys 16 are of one diameter so that the two upper straight runs of the belts 14 lie in a common plane. The frame structure 20 also carries a table 22 which has its upper face terminating slightly beneath the upper straight runs of the two belts 14, the table being appropriately cut out to accommodate the two belts. To one of the shafts 18 is connected a pulley 24 for coaction with a drive belt 26.

The second conveyor unit 12 comprises a single endless belt 28 which is of considerable width and runs on two pulleys 30 mounted on shafts 32 suitably supported by bearings on the frame structure 20. A drive pulley 34 is keyed to one of the shafts 18 for connection with a belt 36 running about a pulley 38 keyed to the other shaft 32. The pulley 34 is larger than the pulley 38, preferably in the ratio of three to two, so that the belt 28 will travel at a higher speed than the belts 14.

The table 22 is formed with an inclined slide 40 extending from the normal level of the table 22 beneath the upper straight runs of the belts 14 to a position above the belts at the delivery end of the slide. Figures 1 and 2 illustrate the inclined slide 40 as having its delivery end extending beyond the vertical axis of the adjacent pulley 30 for dropping cleats onto the belt 28.

In operation, the cleats are loaded onto the belts 14 as they come from the rip saw. All the cleats are arranged transversely of the belts 14, as at 42, in Figure 3. Adjacent one of the belts 14 and on the table 22 is mounted a cleat fence or guide 44, this fence extending substantially the entire length of the table 22 and also paralleling the belt 28.

In Figure 3, the cleats 42 are pushed up the incline 40 by the belts 14 and roll over the end of the incline one at a time and drop upon the belt 28. One cleat 46 in Figure 3 is illustrated in its roll from the incline 40, which cleat turns in a clockwise direction and rotates ninety degrees. The cleats in the series 42 on the incline 40 are pushed therealong in face to face engagement, while the cleats in the series 48 on the belt 28 are spaced at sufficient distances to facilitate observation thereof. Because of the rolling transfer of the cleats from the incline 40 onto the belt 28 and the spaced arrangement of the cleats on the belt, all four faces of the cleats are visible at one time or another so that the cleats may be effectively graded and the defective material removed.

To prevent interference from the fence 44 during the rolling transfer of the cleats, Figure 2 illustrates the fence as being provided with an offset extent 50 throughout its length corresponding to the active turning zone of the cleats. Means are also provided to prevent the cleats from making more than a quarter turn. Two lightweight bars 52 are arranged at an angle to the horizontal and have their upper ends pivotally mounted on a supporting shaft 54 positioned a sufficient distance above the incline 40 to clear the cleats, with their lower ends positioned sufficiently low to lie in the path of the cleats rolling from the incline 40, as illustrated in Figure 3. The bars 52 have short duration contact with the successive cleats and function to positively prevent the cleats from making more than a quarter turn. From the delivery end of the belt 28 the cleats are transferred to the mitering or other woodworking machine.

Inverted V-shaped slides 56 are positioned at the delivery end of the belt 28, onto which the cleats are pushed by the belt 28.

Without further elaboration, the foregoing will so fully illustrate my invention, that others may, by applying current knowledge, readily adapt the same for use under various conditions of service.

I claim:

1. A cleat turner comprising a conveyor means for moving cleats positioned transversely thereon, a drop in said conveyor means for imparting a roll to successive cleats pushed thereover to turn the cleats, means engaging cleats in predetermined turned positions to restrain the cleats from further turning, said conveyor means comprising a first conveyor unit provided with said drop, a second conveyor unit for conveying the turned cleats, said first conveyor unit comprising two spaced cleat-carrying belts and said drop comprising an inclined surface extending from a position beneath the cleat-carrying surfaces of the two cleat-carrying belts to a position above the second conveyor unit, said second conveyor unit comprising an endless belt, and a driving connection between said two cleat-carrying belts and said endless belt for driving the latter at a greater speed than said two cleat-carrying belts to space the cleats on the endless conveyor one from the other.

2. A cleat turner comprising a conveyor means for moving cleats positioned transversely thereon, a drop in said conveyor means for imparting a roll to successive cleats pushed thereover to turn the cleats, means engaging cleats in predetermined turned positions to restrain the cleats from further turning, said conveyor means comprising a first conveyor unit provided with said drop, a second conveyor unit for conveying the turned cleats, said first conveyor unit comprising two spaced cleat-carrying belts and said drop comprising an inclined surface extending from a position beneath the cleat-carrying surfaces of the two cleat-carrying belts to a position above the second conveyor unit, said second conveyor unit comprising an endless belt, a driving connection between said two cleat-carrying belts and said endless belt for driving the latter at a greater speed than said two cleat-carrying belts to space the cleats on the endless conveyor one from the other, and means at the delivery end of said endless belt for raising cleats to positions above that belt.

3. A cleat turner comprising a conveyor means for moving cleats positioned transversely thereon, a drop in said conveyor means for imparting a roll to successive cleats pushed thereover to turn the cleats, means engaging cleats in predetermined turned positions to restrain the cleats from further turning, said conveyor means comprising a first conveyor unit provided with said drop, a second conveyor unit for conveying the turned cleats, said first conveyor unit comprising two spaced cleat-carrying belts and said drop comprising an inclined surface extending from a position beneath the cleat-carrying surfaces of the two cleat-carrying belts to a position above the second conveyor unit, said second conveyor unit comprising an endless belt, a driving connection between said two cleat-carrying belts and said endless belt for driving the latter at a greater speed than said two cleat-carrying belts to space the cleats on the endless conveyor one from the other, and a table extending horizontally about the cleat-carrying surfaces of said first and second conveyor units.

4. A cleat turner comprising a conveyor means for moving cleats positioned transversely thereon, a drop in said conveyor means for imparting a roll to successive cleats pushed thereover to turn the cleats, means engaging cleats in predetermined turned positions to restrain the cleats from further turning, said conveyor means comprising a first conveyor unit provided with said drop, a second conveyor unit for conveying the turned cleats, said first conveyor unit comprising two spaced cleat-carrying belts and said drop comprising an inclined surface extending from a position beneath the cleat-carrying surfaces of the two cleat-carrying belts to a position above the second conveyor unit, said second conveyor unit comprising an endless belt, a driving connection between said two cleat-carrying belts and said endless belt for driving the latter at a greater speed than said two cleat-carrying belts to space the cleats on the endless conveyor one from the other, means at the delivery end of said endless belt for raising cleats to positions above that belt, and a table extending horizontally about the cleat-carrying surfaces of said first and second conveyor units.

5. In apparatus for conveying and turning articles of rectangular contour, a conveyor having spaced parallel conveyor sections for moving said articles along a horizontal path, a surface between said sections co-extensive with said path having an upward inclination from one end of the path to a drop off point, and a second conveyor longitudinally aligned with the inclined surface for carrying the articles from the drop off point, said second conveyor having its receiving end disposed at a level below the drop off point whereby the articles are turned through an angle of approximately ninety degrees as they are moved from the drop off point to the second conveyor and means contacting the articles during their turning movement at the take off point to partially limit the extent of the turning.

JAMES DONALD McINTYRE.